(12) United States Patent
Ring et al.

(10) Patent No.: US 6,536,984 B1
(45) Date of Patent: Mar. 25, 2003

(54) TAPER LOCK FASTENING BRACKET SYSTEM AND METHOD OF ASSEMBLY

(76) Inventors: James G. Ring, 1259 Forrest Dr., Metamora, IL (US) 61548; Kevin L. Brinkman, 312 E. Hoffman Rd., Metamora, IL (US) 61548

( * ) Notice: Subject to any disclaimer, the term of this patent is extended or adjusted under 35 U.S.C. 154(b) by 119 days.

(21) Appl. No.: 09/642,738

(22) Filed: Aug. 18, 2000

(51) Int. Cl.[7] .............................. B25G 3/36; E04B 1/38
(52) U.S. Cl. .................... 403/403; 403/409.1; 403/363; 312/265.6; 52/461
(58) Field of Search .............................. 403/409.1, 402, 403/403, 363; 312/265.6; 52/461

(56) References Cited

U.S. PATENT DOCUMENTS

| | | | |
|---|---|---|---|
| 1,870,157 A | | 8/1932 | Williams |
| 1,919,780 A | * | 7/1933 | Fairbank ................. 403/341 X |
| 2,796,642 A | | 6/1957 | Woodworth .................... 20/92 |
| 2,869,694 A | | 1/1959 | Breckheimer ................. 189/36 |
| 3,243,245 A | | 3/1966 | Kewley ....................... 312/108 |
| 3,828,514 A | | 8/1974 | Jureit ........................ 52/753 D |
| 4,048,059 A | | 9/1977 | Evans ......................... 108/155 |
| 4,221,302 A | | 9/1980 | Kupersmit .................. 220/4 F |
| 4,518,279 A | * | 5/1985 | Suttles ........................ 403/231 |
| 4,552,388 A | * | 11/1985 | Meinig ................... 403/402 X |
| 4,586,300 A | * | 5/1986 | Mullin ................... 403/345 X |
| 4,596,488 A | | 6/1986 | Schendan .................... 403/402 |
| 4,796,392 A | | 1/1989 | Graham, Jr. ................. 52/79.5 |
| 5,259,691 A | * | 11/1993 | Moore et al. ............... 403/402 |
| 5,524,394 A | * | 6/1996 | Szabo, Sr. et al. ...... 403/381 X |
| 5,605,412 A | | 2/1997 | Davis et al. ................. 403/403 |
| 5,674,023 A | | 10/1997 | Williams .................... 403/231 |
| 5,860,759 A | * | 1/1999 | Leicht ................. 403/409.1 X |
| 5,875,602 A | | 3/1999 | Lappin et al. ................. 52/712 |
| 6,012,791 A | * | 1/2000 | Benner et al. ........... 312/265.2 |
| 6,082,501 A | * | 7/2000 | Lehmann .................. 52/284 X |
| 6,120,206 A | * | 9/2000 | Benner et al. .............. 403/231 |
| 6,126,355 A | * | 10/2000 | Clover, Jr. ........... 403/408.1 X |
| 6,354,759 B1 | * | 3/2002 | Leicht ........................ 403/403 |

* cited by examiner

Primary Examiner—Lynne H. Browne
Assistant Examiner—Ernesto Garcia
(74) Attorney, Agent, or Firm—Husch & Eppenberger; H. Frederick Rusche; Robert E. Muir

(57) ABSTRACT

A fastening bracket system for connecting two abutting members at a fixed angle includes a locking bracket having a flange and attached to one member and a channel bracket having a channel and attached to the other member. The channel or the flange, or both, is tapered. The flange is inserted into the channel until it becomes locked. Multiple locking brackets and channel brackets may be used in series to form longer joints.

A method of assembling a joint from two abutting members at a fixed angle includes the steps of attaching at least one locking bracket having a flange to one of the members and at least one channel bracket having a channel to the other member, either the flange or the channel being tapered; positioning the members in the desired angle; and inserting the flange into the channel until it is locked, thereby locking the brackets together and securing the two members in position.

10 Claims, 7 Drawing Sheets

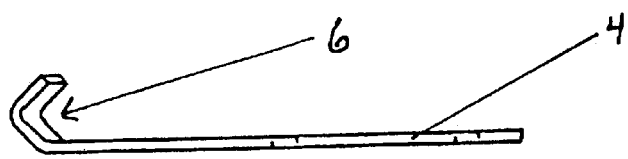
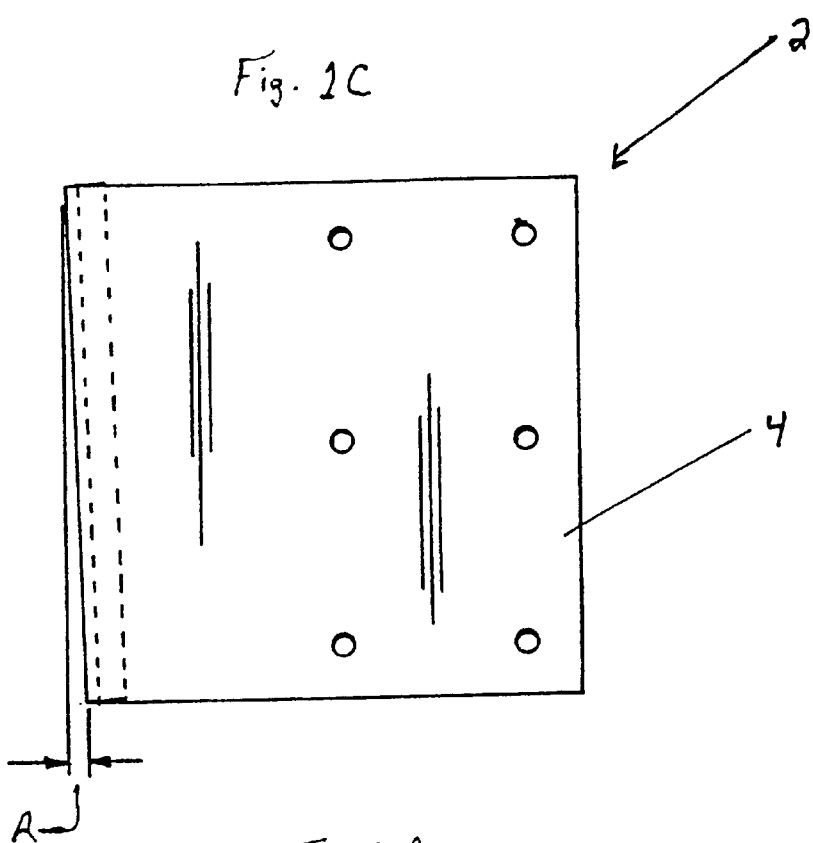

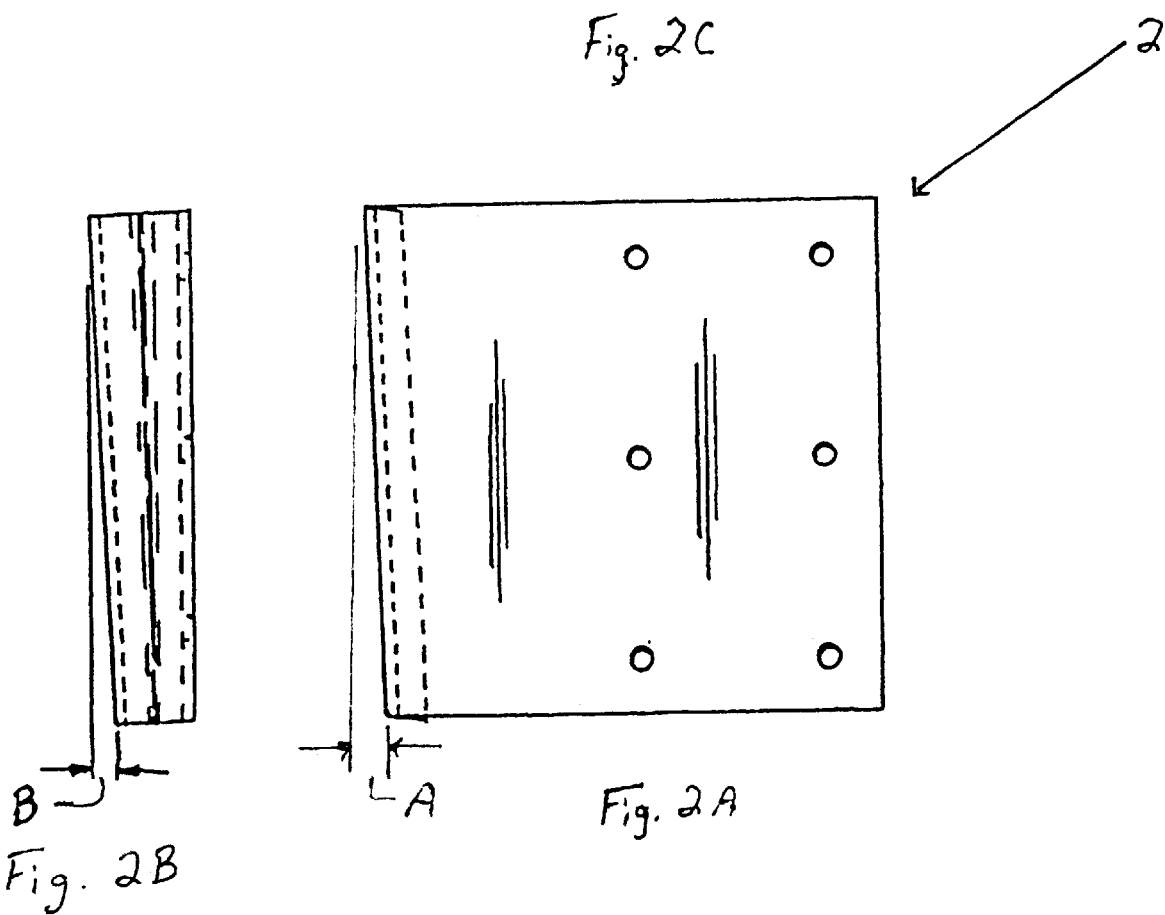

TAPER LOCK FASTENING BRACKET SYSTEM AND METHOD OF ASSEMBLY

TECHNICAL FIELD

This invention relates generally to connecting structures and, more particularly, to a fastening bracket system and method of assembly designed to hold two abutting members together at any fixed angle.

BACKGROUND OF THE INVENTION

Abutting members of various materials are routinely joined by any number of common mechanisms, including screw, bolts, glue, welds, rivets, clamps and tape among others. The particular mechanism used is often dictated by the circumstances surrounding the joint. Limitation on the space available in which to assemble the joint is quite often an extremely important controlling circumstance. Standard joint assembly mechanisms typically become quite awkward when assembly must be performed in tight spaces. For example, construction of elevators or handicap lifts requires the assembly of the elevator cab within the confines of the elevator shaft. This assembly includes the extended joints formed by the sides of the cab. It is often impractical or even impossible to utilize most standard joining mechanisms in such an application because most of the exterior area of the joint is inaccessible to workers. Those mechanisms that are possible to utilize in such tight spaces, such as glue or tape, will not provide sufficient structural integrity for this type of application.

SUMMARY OF THE INVENTION

It is an object of the present invention to overcome the problems described above.

One object of the present invention is to provide a simple mechanism for forming joints between two members which allows assembly of a structure within a limited space.

Another object of the invention is provide a method of assembly which requires only simple hardware and very few tools.

In accordance with the present invention, there is provided a system of brackets which includes at least one bracket fastened to each member comprising a joint. One of these brackets, referred to as a channel bracket, contains a channel. A locking bracket attached to the other member includes a flange which is inserted into the channel. The flange or the channel, or both, is tapered. The taper in either of these brackets acts in concert with the other bracket to pull the joint together. A single pair of brackets, one attached to each member of the joint, or multiple pairs of brackets may be used to assemble the joint.

If the channel is tapered, it is always tapered in a first direction toward the joint and may also be tapered in a second direction generally perpendicular to the first direction. As the flange is forced further into the tapered channel, the flange, along with the locking bracket and attached member, is pulled in the direction of the taper until the flange is securely locked into the channel. This mechanism thereby secures the brackets and the attached members together, forming a secure joint. If the flange is tapered, it is forced into a straight channel and gradually pulls the entire channel bracket and attached member towards the locking bracket until the brackets are locked together.

Other objects, aspects, features and advantages of the present invention will become apparent from the following detailed description when taken in conjunction with the referenced drawings.

BRIEF DESCRIPTION OF THE DRAWINGS

Reference is now made to the drawings which illustrate the best known mode of carrying out the invention and wherein the same reference numerals indicate the same or similar parts throughout the several views.

FIGS. 1A, 1B and 1C are front, side and top views of a channel bracket having a channel tapered in one direction.

FIGS. 2A, 2B and 2C are front, side and top views of a channel bracket with a channel tapered in two directions.

DESCRIPTION OF THE PREFERRED EMBODIMENT

Figures 3A, 3B:
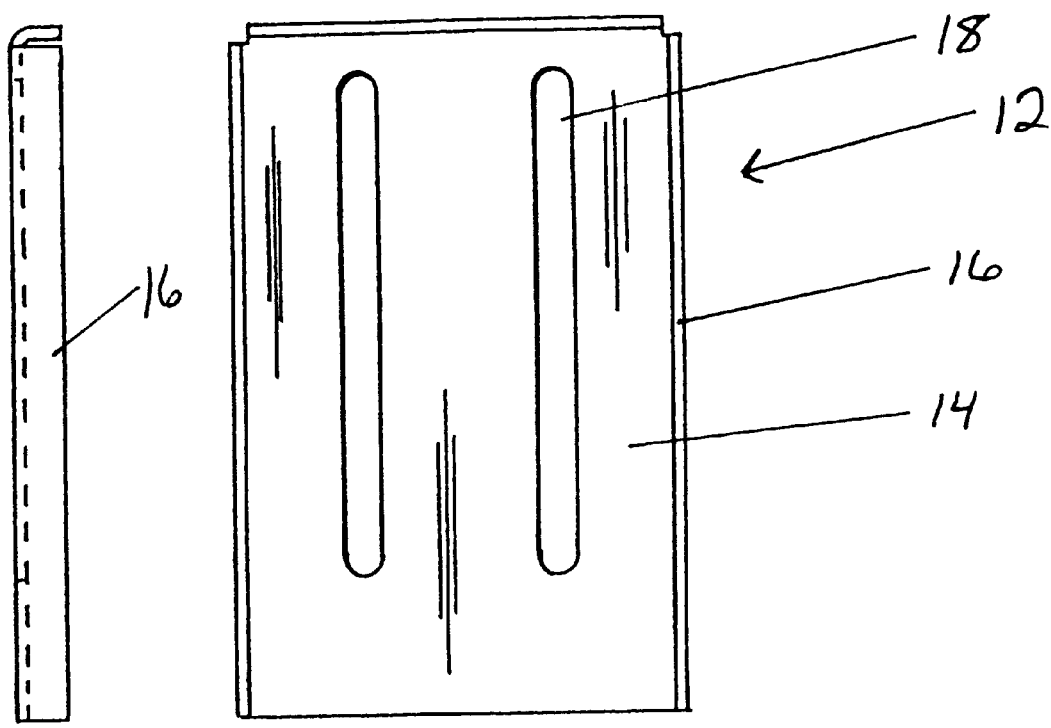
FIGS. 3A, 3B and 3C are front, side and bottom views of a locking bracket with a straight flange.

In one embodiment of the invention, there are provided channel brackets 2 as shown in FIGS. 1A, 1B, 1C and in FIGS. 2A, 2B, 2C which include a mounting section 4 and a tapered channel 6. In one embodiment, the channel 6 is generally V-shaped. The mounting section 4 is secured to the first of two abutting members 8, 10, shown in FIG. 6, by any standard method, including, for example, screws, bolts, or welding. In securing the mounting section 4, the tapered channel 6 overhangs the end of the member 8, as shown in FIGS. 6–9. As shown particularly well in FIG. 6, the channel 6 tapers in a direction back toward the joint formed by the two members 8, 10. The taper is shown by angle A in FIG. 1A. This causes a gradual reduction ID in the available area between the channel 6 and the second member 10 and pulls the second member 10 towards the first member 8.

In another embodiment, the channel 6' is tapered in two directions. Referring to FIG. 2A, the first taper is shown by angle A like that in the FIG. 1A embodiment. A second taper is shown by angle B in FIG. 2B. This second taper occurs in a direction perpendicular to the first taper. As shown in FIG. 2C, this pulls the second member 10 towards the channel bracket 2 as well towards the first member 8, thereby securing the joint in two directions.

Figure 3C:
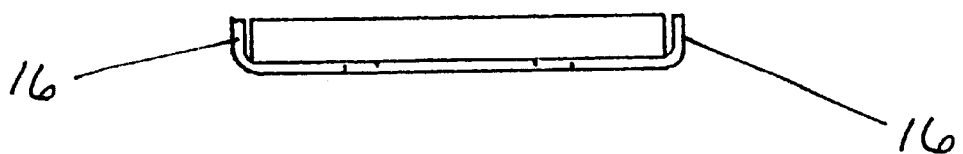
Figure 4:
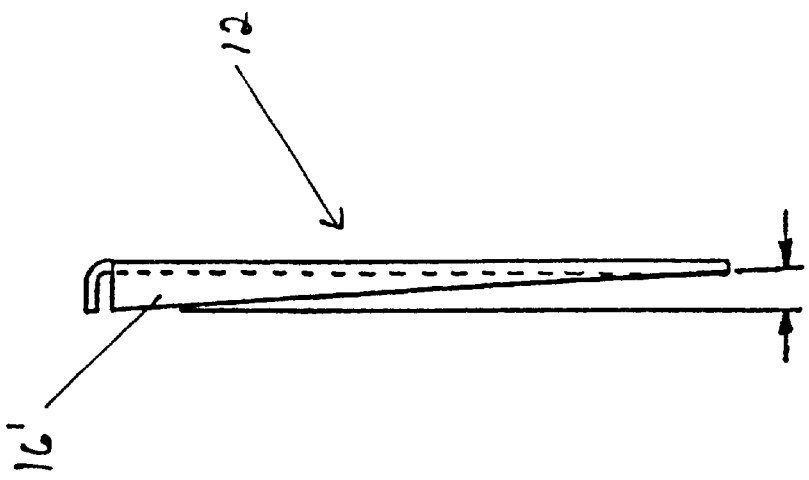
FIG. 4 is a side view of a locking bracket with a wedge flange.
Figure 6:
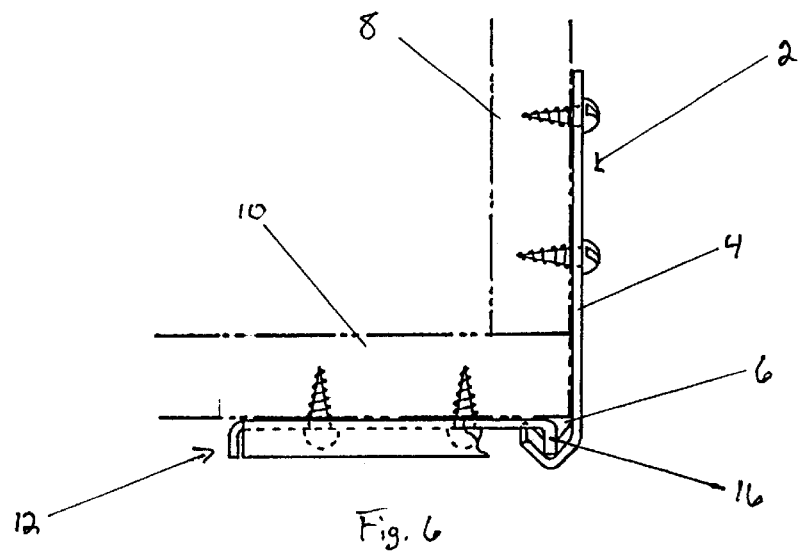
FIG. 6 is a top view of a joint formed by two abutting members secured by a channel bracket and locking bracket.

FIGS. 3a–3c and 4 show two types of locking brackets 12 which are used in conjunction with the channel brackets 2. The locking brackets 12 include a mounting section 14 and at least one flange 16. The locking bracket 12 is attached to the other abutting member 10 near the edge of the member. The mounting section 14 of the locking bracket 12 may be attached to the member 10 by any standard method, including, for example, screws, bolts, or welding. In a preferred embodiment, the mounting section 14 is provided with slotted openings 18 to accept fasteners, such as screws or bolts, which attach it to the member 10. As described below, this arrangement allows the locking bracket 12 to be conveniently slid into position after both members 8, 10 are properly placed. The locking bracket 12 may have a flange 16 with a constant width, as shown in FIG. 3a–3c or a wedge-shaped flange 16', as shown in FIG. 4. A locking bracket 12 with a flange 16 of constant width is normally used with a tapered channel bracket 2.

Figure 5:
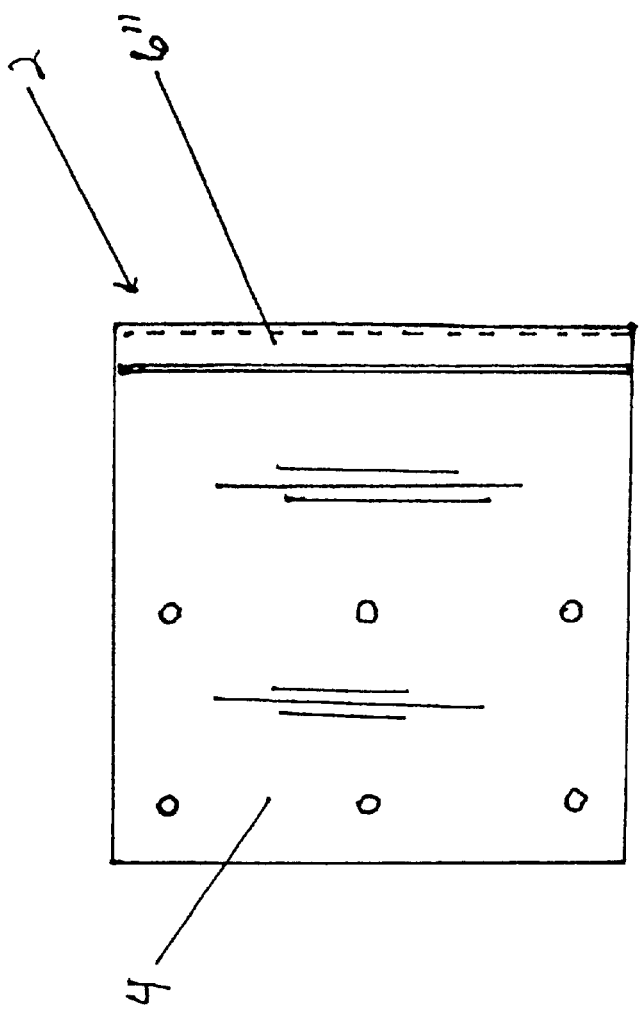
FIG. 5 is a rear view of a channel bracket with a straight channel.

FIG. 5 shows a channel bracket 2' with a straight channel 6". This bracket is normally used with a locking bracket 12 having a wedge-shaped flange 16'. As the wedge-shaped flange 16' is forced into a straight channel 6", it gradually pulls the entire channel bracket 2' and attached member 8 towards the locking bracket 12 until the brackets 2', 12 are locked together.

FIGS. 6–9 show the channel 2 and locking 12 brackets in operation. Once the channel 2 and locking 12 brackets are attached to the first 8 and second 10 members, respectively, the flange 16 is inserted into the wider end of the tapered channel 6. The overhanging position of the channel bracket 2 allows the end of the second member 10 and the locking bracket 12 to be placed between the tapered channel 6 and the end of the first member 8. The flange 16 is then forced further into the channel 6 in the direction of the taper. The width of the flange 16 is such that after a certain distance, it will encounter more and more resistance from the walls/sides of the tapered channel 6 until it is securely locked within the channel 6.

Note that while the figures illustrate the system being used to form a 90° angle, other joint angles can be accommodated. The channel should be parallel to the direction of the flange in order to securely lock the brackets together. This will require the user to bend the channel bracket 2 between the channel 6 and the mounting section 4 for angles other than 90°.

Figure 7:
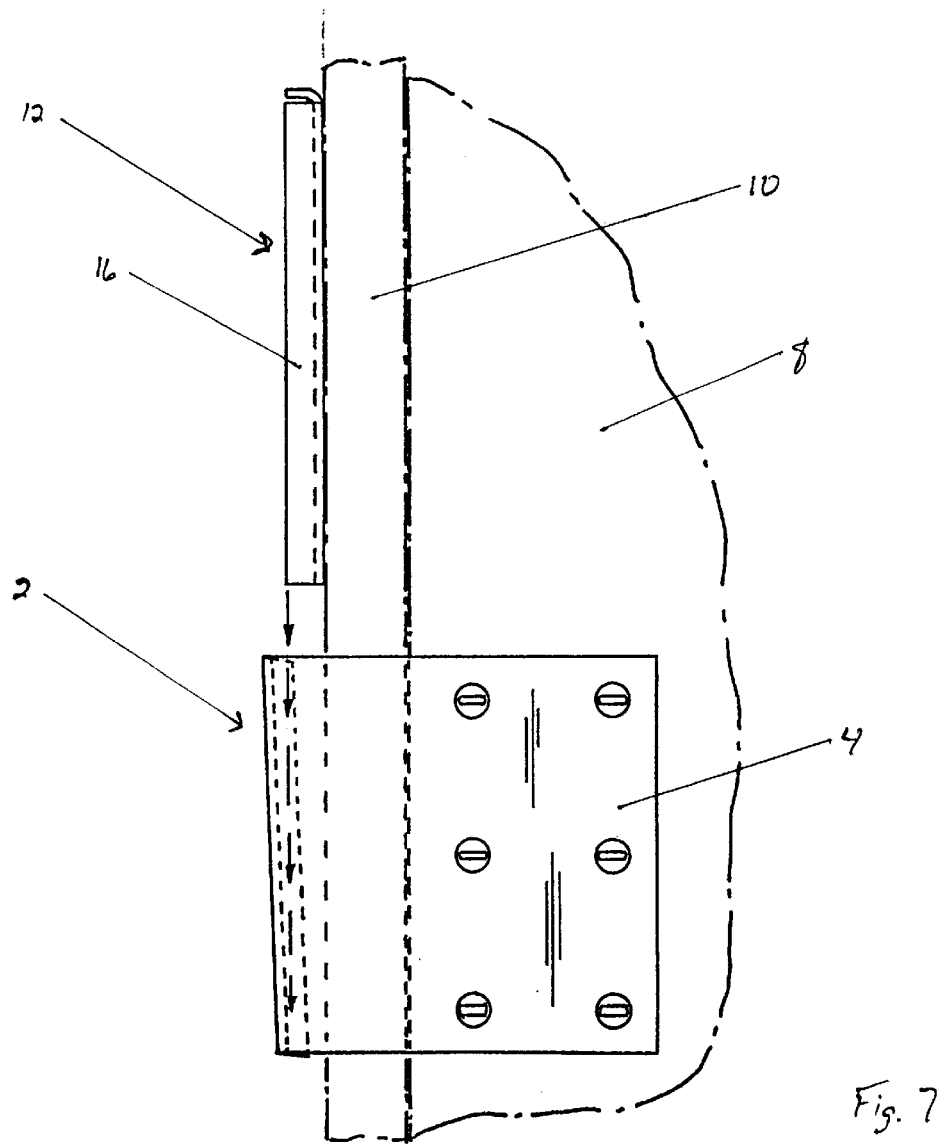
FIG. 7 is a partial side view of a joint being formed by two abutting members secured by a channel bracket and a locking bracket with a straight flange.
Figure 8:
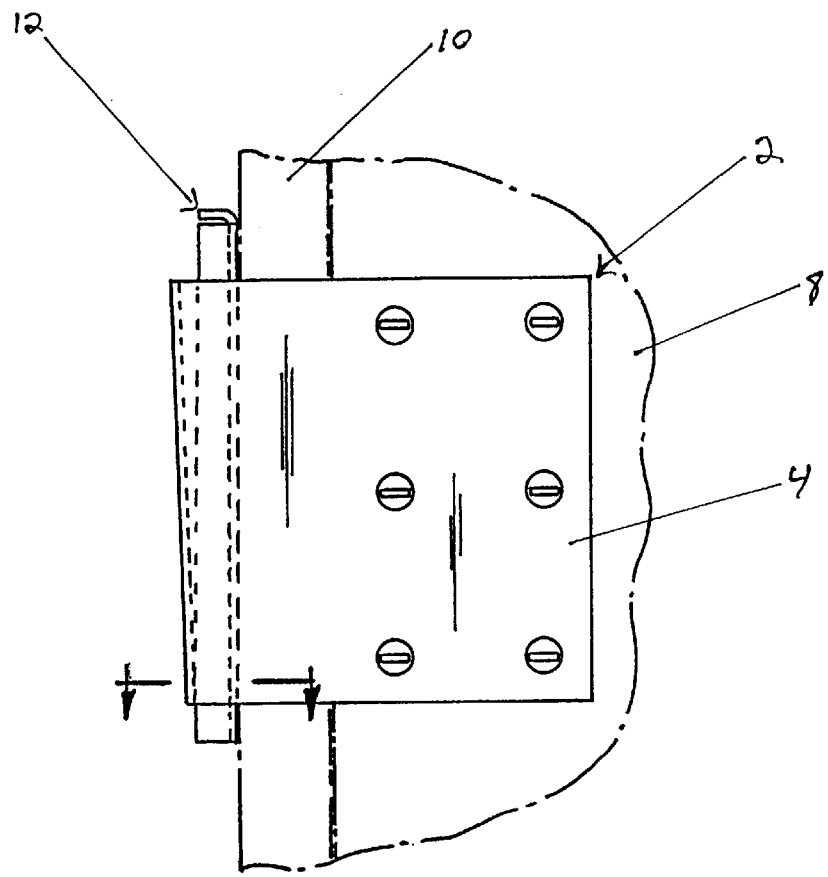
FIG. 8 is a partial side view of a completed joint formed by two abutting members secured by a channel bracket and a locking bracket with a straight flange.
Figure 9:
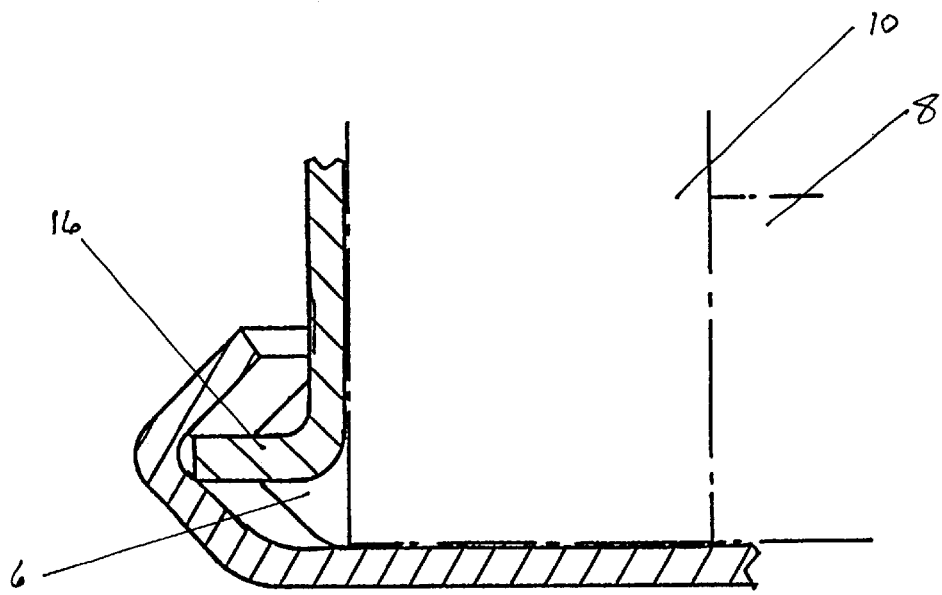
FIG. 9 is a cross-sectional view taken along the section line A—A in FIG. 8.

In the preferred embodiment in which the locking bracket 12 is equipped with slotted openings 18 in its mounting section 14, both brackets 2, 12 will be attached to the members 8, 10. The members 8, 10 are then positioned at the desired angle. Because the slotted openings 18 allow for a certain amount of vertical movement of the locking bracket 12, it then can be forced into the locked position without moving the members 8, 10. FIG. 7 illustrates this process.

Figure 10:
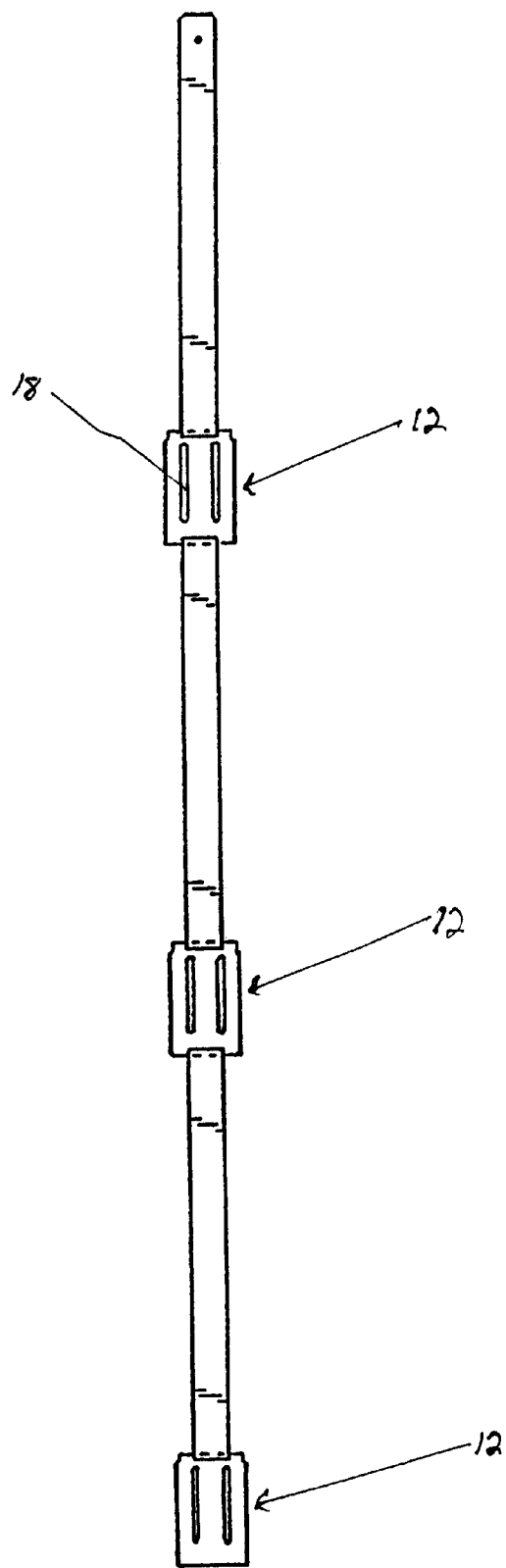
FIG. 10 is a front view of a series of connected locking brackets.
Figure 11:
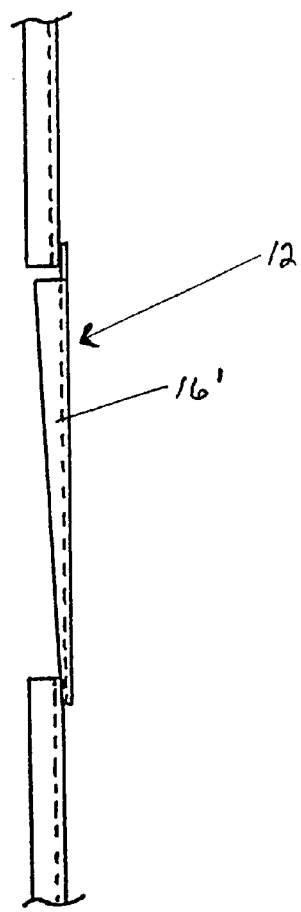
FIG. 11 is a partial side view of a locking bracket with a wedge-shaped flange connected in a series of locking brackets.

For joints of extended lengths, it is preferred to use a series of channel brackets 2 on the first member 8 and a series of locking brackets 12 on the second member 10. This ensures that the joint is secured at multiple points along its length so that no gaps are allowed to form. It is a particularly preferred embodiment to connect a series of locking brackets 12 having slotted mounting openings 18 in this system, see FIG. 10. The channel brackets 2 are attached to the first member 8 and the connected series of locking brackets 12 are connected to the second member 10 before positioning the members. Once the members 8, 10 are positioned, the series of locking brackets 12 can be inserted into the respective channel brackets 2 simply by exerting a force on the topmost locking bracket. This results in a greatly simplified assembly procedure for extended joints.

This procedure is particularly advantageous in constructing elevator cabs. Assembling the cabs occurs within the confines of the elevator shaft. The extremely limited space within the shaft limits or completely eliminates access to the exterior of the cab during assembly. In addition, smooth interior surfaces with no showing hardware are almost always desirable. The above-described embodiment allows the workers assembling the cab to form the extending joints of the cab walls while only requiring access from above or below of the partially assembled cab. Also, because all of the hardware is mounted on the exterior of the cab, the interior surfaces remain free of any visible hardware.

A method of assembling members forming a joint using the above-described brackets includes the steps of attaching at least one channel bracket 2 having a tapered channel 6 to one of the members 8; attaching at least one locking bracket 12 having a flange 16 to the other member 10; positioning the members at the desired angle to one another; and inserting the flange 16 into the tapered channel 6 in the direction of the taper until the flange 16 is locked into the channel 6. In another embodiment, multiple channel brackets 2 are attached to the first member 8, and a series of connected locking brackets 12, attached to the second member 10, are used to form extended joints. A channel bracket 2' with a straight channel 6" is used in conjunction with a locking bracket 12 with a wedge-shaped flange 16' in another embodiment of the method.

Other objects, features and advantages of the present invention will be apparent to those skilled in the art. While preferred embodiments of the present invention and steps of the method have been illustrated and described, this has been by way of illustration and the invention should not be limited except as required by the scope of the appended claims.

We claim:

1. In an elevator cab having first and second upright walls disposed at an angle to one another, said upright walls each having an exterior surface, a fastening bracket system for forming a joint between the first and second upright walls, comprising a locking bracket attached to the exterior surface of the first upright wall and a channel bracket attached to the exterior surface of the second upright wall, the locking bracket having a flange and the channel bracket having a channel to accept the flange, at least one of the brackets having a tapered feature, wherein the tapered feature is tapered in a generally vertical direction.

2. The fastening bracket system in the elevator cab as set forth in claim 1, wherein the locking bracket is provided with a wedge-shaped flange.

3. The fastening bracket system in the elevator cab as set forth in claim 1, wherein the channel of the channel bracket is tapered.

4. The fastening bracket system in the elevator cab as set forth in claim 3, wherein the tapered channel is tapered in a first direction toward the joint.

5. The fastening bracket system in the elevator cab as set forth in claim 3, wherein the tapered channel is tapered in a second direction generally perpendicular to the first direction.

6. The fastening bracket system in the elevator cab as set forth in claim 3, wherein the tapered channel has a generally V-shaped cross-section.

7. The fastening bracket system in the elevator cab as set forth in claim 3, wherein the locking bracket includes a mounting section having slotted mounting openings; and, fasteners passing through the slotted mounting openings for attaching the locking bracket to the first member.

8. The fastening bracket system in the elevator cab as set forth in claim 3, wherein the flange of the locking bracket has a substantially constant width.

9. The fastening bracket system in the elevator cab as set forth in claim 3, wherein the locking bracket has a wedge-shaped flange.

10. The fastening bracket system in the elevator cab as set forth in claim 3, further including a plurality of locking brackets and a plurality of channel brackets.

* * * * *